No. 758,728. PATENTED MAY 3, 1904.
W. N. WIGHT & F. E. TOWNSEND.
FLOOR AND PROCESS OF BUILDING SAME.
APPLICATION FILED MAR. 23, 1903.
NO MODEL. 2 SHEETS—SHEET 1.

WITNESSES:
Fred White
René Bruine

INVENTORS:
William N. Wight and Fred E. Townsend,

By Attorneys,

No. 758,728. PATENTED MAY 3, 1904.
W. N. WIGHT & F. E. TOWNSEND.
FLOOR AND PROCESS OF BUILDING SAME.
APPLICATION FILED MAR. 23, 1903.
NO MODEL. 2 SHEETS—SHEET 2.

WITNESSES:
Fred White
René Bruine

INVENTORS:
William N. Wight and Fred E. Townsend,

By Attorneys,
Arthur E. Dresser & Co.

No. 758,728. Patented May 3, 1904.

UNITED STATES PATENT OFFICE.

WILLIAM N. WIGHT AND FRED E. TOWNSEND, OF NEW YORK, N. Y.

FLOOR AND PROCESS OF BUILDING SAME.

SPECIFICATION forming part of Letters Patent No. 758,728, dated May 3, 1904.

Application filed March 23, 1903. Serial No. 149,080. (No model.)

*To all whom it may concern:*

Be it known that we, WILLIAM N. WIGHT, residing in the borough of Manhattan, county of New York, and FRED E. TOWNSEND, residing in the borough of Brooklyn, county of Kings, city and State of New York, both citizens of the United States, have jointly invented certain new and useful Improvements in Floors and Processes of Building Same, of which the following is a specification.

Our invention aims to provide certain improvements in floors, which improvements are especially adapted for the building of floors of long span. For example, our improved floor is adapted to extend from one to another of the girders or other main supports commonly used in buildings without the intermediation of the I-beams commonly employed between the girders.

The accompanying drawings illustrate floors embodying our invention.

Figure 1:
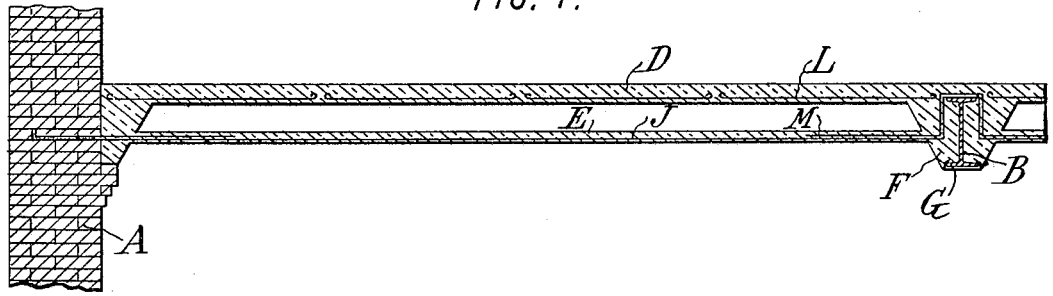
Figure 2:
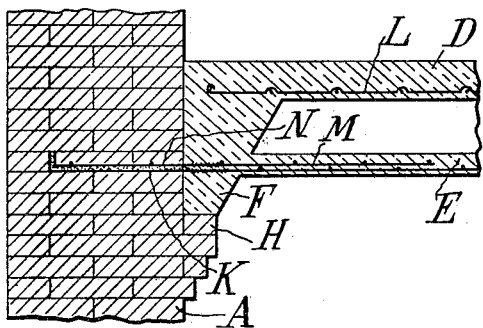
Figure 3:
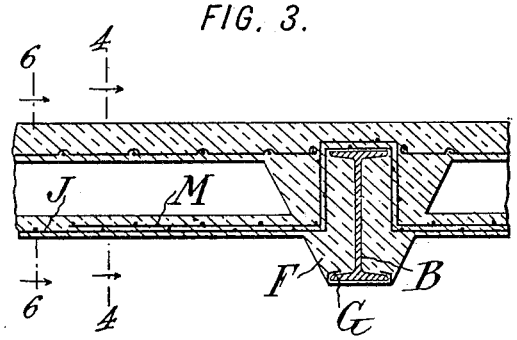
Figure 4:
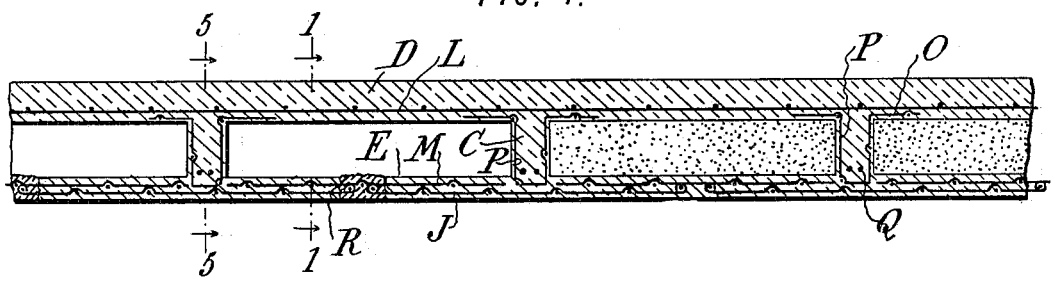
Figure 5:
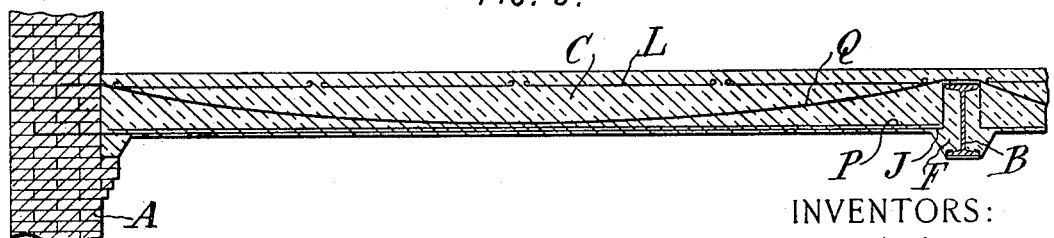
Figure 6:
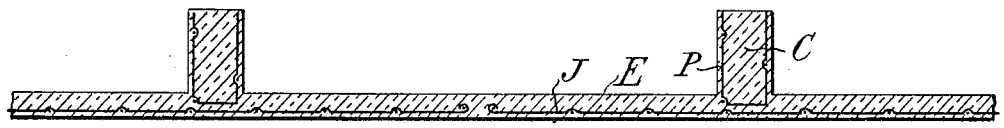
Figure 7:
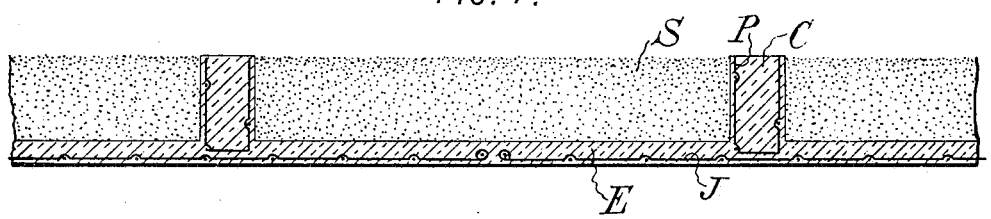
Figure 8:
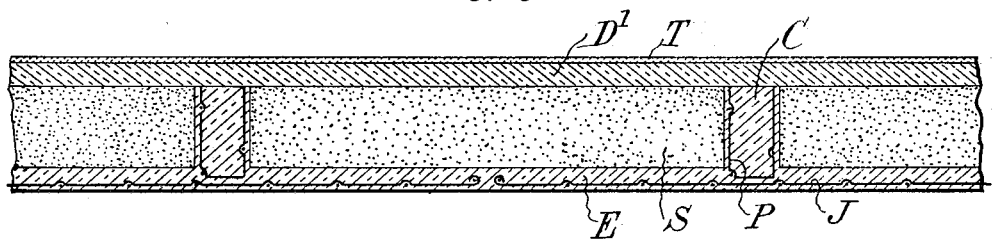
Figures 9, 10:
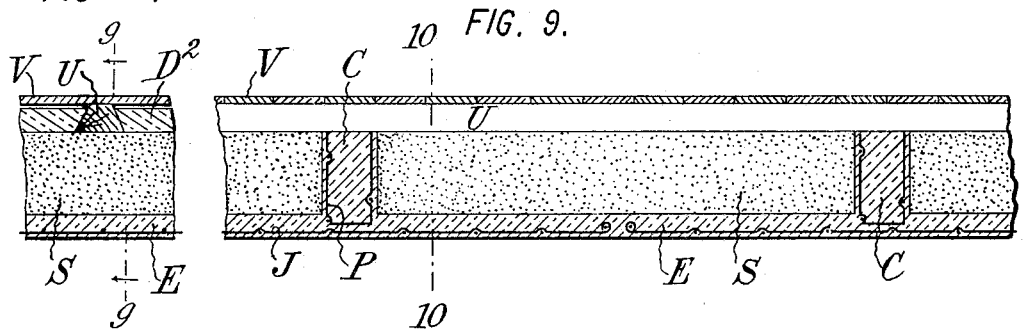

Figure 1 is a section transverse to the girder and wall supporting the floor, the plane of section being indicated by the line 1 1 of Fig. 4. Figs. 2 and 3 are sections, on an enlarged scale, showing in detail the end portions of Fig. 1. Fig. 4 is a section on the line 4 4 of Fig. 3. Fig. 5 is a section on the line 5 5 of Fig. 4. Figs. 6, 7, and 8 are sections similar to Fig. 4, illustrating certain embodiments of the invention which may also be considered as certain stages of the work in course of construction, the plane of section being indicated at 6 6 of Fig. 3. Fig. 9 is a section on the line 9 9 of Fig. 10, illustrating another embodiment of the invention. Fig. 10 is a section on the line 10 10 of Fig. 9.

According to one feature of our invention we mold concrete beams in place, extending transversely of the usual widely-separated girders or a girder and wall, as illustrated in Fig. 1, or any other suitable main supports, and we extend floor-plates uninterruptedly from one to another of said beams. The floor-plate is preferably of concrete formed in a monolith with the concrete beam. Preferably, also, ceiling-plates are provided extending uninterruptedly from one to another of said beams and spaced apart from the floor-plates, and preferably, also, these ceiling-plates are formed in a monolith with the concrete beams. Either or both of said plates may be provided with a metal reinforce extending throughout the plate and with an additional metal reinforce carried by the girder or beam which supports the plate and extends into the edge of the plate, so as to provide additional resistance against shearing strains. Preferably the reinforcing in the ceiling-plate is supported by the main supports, as by sheets of fabric extending transversely of said main supports, and the reinforcing for the floor-plate is supported by the transverse beams and comprises sheets of fabric extending transversely of said beams.

Referring to the embodiments of the invention illustrated, A and B represent two main supports—the wall of the building and a girder, respectively. Extending transversely of these main supports are beams C, of concrete, molded in place, and floor-plates D, extending uninterruptedly from one to another of said beams, Fig. 4. The floor-plates may be built simultaneously with the building of the beams, or the latter may be built first and the floor-beams afterward molded in connection therewith, the old surface of the beams being wet and coated with fresh cement in the well-known way, so that in either case the floor-plate and beam form, substantially, a monolith, of concrete. Ceiling-plates E also extend from beam to beam and are preferably spaced apart from the floor-plates, as shown, and formed in a monolith with the beams, as described. The beams are horizontal throughout substantially their entire length, and the ceiling-plates are preferably level with the lower faces of the beams. The portions of the beams and preferably of the entire floor adjacent to the main supports extend downwardly to provide an abutment, of concrete, F, carrying the load or a portion thereof to the lower flange G of the girder, or a similar projection H, provided on the wall A for that purpose. These downwardly-extending end portions F serve to economize material, giving the ceiling between the main supports approximately the lines of an arch and at the same time serve to envelop and protect the girders B. In fact, for the main supports we may use girders entirely of concrete instead of the metal girders B, in which case they would preferably be of approximately the design of the portion F, but somewhat deeper, according to the loads to be carried. The entire structure is quite light and of less depth than the girders B, although strong enough to extend over very large spans. There is thus a great saving in cost and weight, and the construction is very rapid by reason of the large areas of floor which can be built at once.

Great strength may be secured by reinforcing the concrete with metal, and a system of reinforcing especially adapted for this construction is illustrated. The lower or ceiling plate carries a metal reinforce J, extending throughout its length and preferably comprising sheets of wire fabric similar to that described in detail in the application of William N. Wight, Serial No. 114,868, filed July 9, 1902. The sheets of fabric J preferably extend transversely of the main supports A and B, so that they may be supported at their ends by these main supports. The preferred arrangement is to run the sheets J continuously over any girders B, which may be placed intermediate between the walls of the building, and to support the sheets from the wall by embedding in the wall short strips of fabric K with a small projecting edge which when the floors are to be built is wired to the ends of the sheets J. With this arrangement the ceiling-plate receives its principal support from the main supports A B. We prefer to combine with this method of reinforcing the ceiling-plate the supporting of the reinforcement for the floor-plate by the concrete beams C. The reinforcement L for the floor-plate is preferably in the form of sheets of fabric similar to those shown for the reinforcement J of the ceiling-plate, and these sheets of fabric extend transversely of the beams C and continuously over any number of such beams, as indicated in Fig. 4. In addition to the reinforce extending throughout the plates either and preferably both are provided with an additional metal reinforce carried by one of the supports and extending into the edge of the plate adjacent to such support. For example, the ceiling-plates may be provided with additional shear reinforcements M in the form of short sheets of wire fabric extending over the girder B and into the adjacent bay at the other side of the girder or at the side adjacent to a wall of the building connected to strips of fabric N, embedded in the wall in the course of its erection. The shear reinforcement for the floor-plates may consist of short strips of fabric O, extending a slight distance from the beam into the floor-plates.

The concrete beams may be provided with reinforces consisting, preferably, of wire fabric P, extending adjacent to the vertical sides of the beam and preferably also, horizontally across the lower portion of the beam and in one piece with the shear-reinforces O of two adjacent floor-plates, thus not only reinforcing the beam, but tying it firmly to the floor and ceiling plates. In addition to the wire fabric adjacent to the faces of the beams they may be additionally reinforced by wires or rods Q, extending throughout their length, preferably in the form of a catenary connected at opposite ends to the opposite main supports, as A and B. (See especially Fig. 5.) The beam is thus well reinforced against tensile strains, against which, as is well known, its resistance is comparatively weak, and the reinforcing is greatest in its lower portion, where the tensile strains are a maximum. It is supported first upon the reinforced ceiling-plate and in addition by the horizontal portion of the wire fabric P, carrying the strain horizontally to the lower part of its end portions, Fig. 5, and by the wires or rods Q, carrying the strain to the upper portion of its ends and directly to the main supports A B.

The invention provides also a new method of erecting floors of the general type of that described, whereby they may be erected cheaply and rapidly. According to this process the ceiling-plate is first molded in place on any suitable center, and therewith or immediately thereafter the concrete beams are molded at suitable intervals and of a height to extend to the desired base of the floor-plate. Thereupon a suitable centering is erected in the spaces between said beams. For example, in the process shown the space between the concrete beams is filled with granular material, such as dry cinders, and shaped to the intended form of the floor-plate between the tops of the beams, giving with practically no labor and without the requirement of skilled work a good surface, upon which a floor-plate of any suitable construction may be laid directly. The filling may be allowed to remain in place, or it may be withdrawn to leave an air-space between the floor and ceiling plates after the floor-plates have set and hardened sufficiently. The granular nature of the material makes it possible to withdraw it through one or more comparatively small openings and very quickly, the "center" formed thereby being of course destroyed at each operation and not merely collapsed or separated into parts of definite shape adapted for reassembling in the same form, as is the case with centerings previously proposed for hollow floors. The fact that the centering is to be destroyed also makes for speed in its removal. The openings being small, no substantial break is made in the continuity of the original floor or ceiling plate through which the center is withdrawn. The removal may be effected through an opening left in the ceiling or floor plate at the time of molding the latter, as described specifically in the application of William N. Wight, filed September 30, 1902, Serial No. 125,361. We prefer, however, to make an opening after the entire concrete structure is formed and hardened by breaking out the concrete at intervals in the length of each ceiling-plate, as indicated at R, Fig. 4, the opening being subsequently filled in with plaster or concrete, as indicated. The fabric J and also the fabric M, where the latter is encountered, have sufficiently large meshes to permit the withdrawal of the granular material, or if a fabric of small mesh be used a small portion of it may be cut away without substantial injury. For example, Fig. 6 shows a ceiling-plate E in combination with the concrete beams or ribs C. The reinforcing-wires Q are omitted from the beams in this figure, and it is proposed to employ such rods only in floors subjected to very heavy loads. Fig. 7 shows the filling or centering S, of granular material, in place and leveled off with the tops of the concrete beams or ribs C, ready to support any suitable floor. For example, floor-plates D, Fig. 4, may be erected thereon and united with the beams in the manner explained, or the floor-plates may be built extending over the tops of the beams, as in Fig. 8, where a solid concrete floor-plate D' (which may be reinforced or not, as desired,) is laid directly on the flat surface provided by the cinders S and beams or ribs C. T indicates a finishing of fine cement, which is ordinarily used. This floor-plate D', though not monolithic with the beams, yet much increases the efficiency of the latter by itself taking part of the strain and distributing its load uniformly upon the beam. With a similar effect floor-plates D², Fig. 10, may be laid over the tops of the beams C, the floor-plates being separated at intervals by wooden sleepers U, upon which is laid a wooden floor V. The plates D², of concrete, constitute in this case what is known as a "sleeper-fill"—that is, a filling of concrete between the sleepers U. In these constructions, as well as in that of Fig. 4, the cinder fill may be subsequently withdrawn to lighten the structure. Any other style of floor proper may be supported upon the structure illustrated in Fig. 6 or in Fig. 7.

While the floor described is specially advantageous for wide spans, such as those between ordinary deep girders, yet it may be also applied with advantage between the secondary beams usually extended between such girders or between any other supports.

The term "main supports" is used to indicate the primary supports of the portion of the floor constructed in accordance with this invention whether the same constitutes the entire floor or a greater or smaller section thereof.

Though we have described with great particularity of detail certain structures embodying our invention, yet it is to be understood that the invention is not limited to the specific structures disclosed. Various modifications thereof are possible in details and in the arrangement and combination of the parts without departing from the invention.

What we claim is—

1. A floor comprising in combination a pair of main supports, concrete beams molded in place extending transversely of said main supports, said beams having downwardly-extending end portions F, floor-plates supported by said beams, and ceiling-plates extending from one to another of said beams substantially coincident with the lower edges thereof.

2. A floor comprising in combination a pair of main supports, concrete beams molded in place extending transversely of said main supports, and concrete ceiling-plates extending from one to another of said beams substantially coincident with the lower edges thereof, said concrete beams and plates having downwardly-extending end portions F.

3. A floor comprising in combination floor-supports, a concrete plate carried thereby, a metal reinforce extending throughout said plate, and an additional metal reinforce carried by one of said supports and extending into the edge of said plate adjacent to the support to effectively resist shearing strains.

4. A floor comprising in combination a support, concrete plates carried thereby on opposite sides thereof, metal reinforces extending throughout said plates, and an additional metal reinforce in the edges of said plates adjacent to the support to effectively resist shearing strains and extending continuously from one to the other of said plates.

5. A floor comprising in combination a concrete beam, a concrete plate carried thereby, a metal reinforce extending throughout said plate, and an additional metal reinforce embedded in said beam and extending into the edge of said plate adjacent thereto to effectively resist shearing strains.

6. A floor comprising in combination a pair of main supports, beams arranged transversely of said main supports, floor and ceiling plates, metal reinforcing in said ceiling-plate supported by said main supports, and metal reinforcing in said floor-plate supported by said beams.

7. A floor comprising in combination a pair of main supports, beams arranged transversely of said main supports, floor and ceiling plates, sheets of reinforcing fabric embedded in said ceiling-plate and extending transversely of said main supports, and sheets of reinforcing fabric embedded in said floor-plate and extending transversely of said beams.

8. A floor comprising in combination main supports and concrete beams molded in place extending transversely of said main supports, said beams being provided with metal reinforcing fabric P extending adjacent to the side faces thereof and horizontally across the lower portion thereof.

9. A floor comprising in combination main supports, concrete beams molded in place extending transversely of said main supports, said beams being provided with metal reinforces adjacent to the faces thereof, and with wires extending in a catenary throughout the length of said beams.

10. The process of molding in place a concrete structure including floor and ceiling plates and ribs separating the same, which consists in molding in place the ceiling-plate and ribs, erecting within the space between said ribs a suitable center for the floor-plate, and laying a floor-plate of concrete directly on said center and extending it continuously and integrally between said ribs.

11. The process of molding in place a concrete structure including floor and ceiling plates and ribs separating the same, which consists in molding in place the ceiling-plate and ribs, filling the space between said ribs with granular material to form a suitable center for the floor-plate, laying a floor-plate of concrete directly on said center and extending it continuously and integrally between said ribs, and destroying said center and withdrawing the material through an opening formed in the concrete for that purpose.

12. The process of molding in place a concrete structure including floor and ceiling plates with an air-space between them which consists in molding the ceiling-plate in place on any suitable center, molding on said ceiling-plate a destructible center of granular material, molding the floor-plate on said center of loose material, and then making an opening in said concrete structure and destroying said destructible center and withdrawing said loose material through said opening.

13. The process of molding in place a concrete structure including floor and ceiling plates with an air-space between them which consists in molding the ceiling-plate in place on any suitable center, molding on said ceiling-plate a destructible center of granular material, molding the floor-plate on said center of loose material, said ceiling-plates being formed with an embedded metallic reinforce of sufficiently large mesh to permit the passage of said granular material, and withdrawing said granular material through the meshes of said reinforce and an opening formed in the concrete of said ceiling-plate for the purpose.

In witness whereof we have hereunto signed our names in the presence of two subscribing witnesses.

WILLIAM N. WIGHT.
FRED E. TOWNSEND.

Witnesses:
 DOMINGO A. USINA,
 FRED WHITE.